Dec. 26, 1933.  R. A. WILKINS  1,941,376
ELECTROLYTIC APPARATUS
Filed Nov. 8, 1929  2 Sheets-Sheet 2
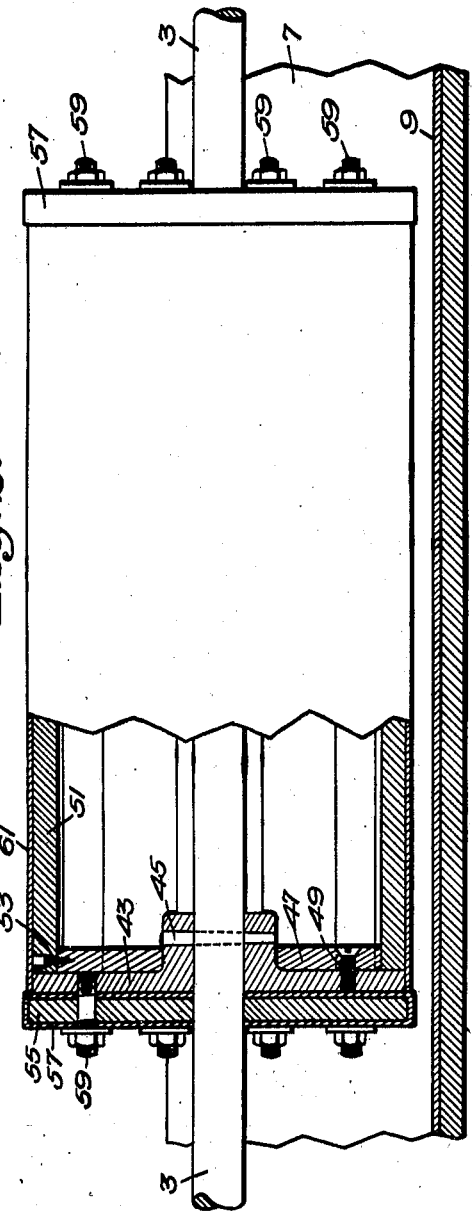
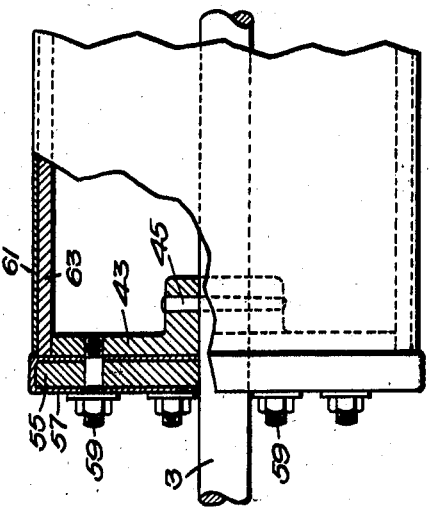
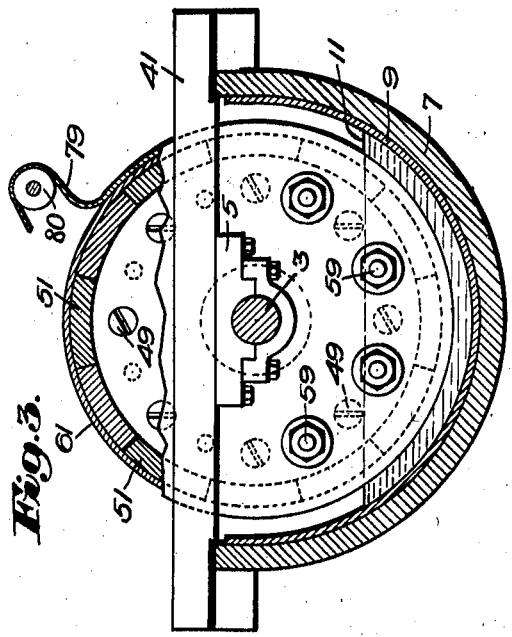
Inventor:
Richard A. Wilkins
Attys Patented Dec. 26, 1933

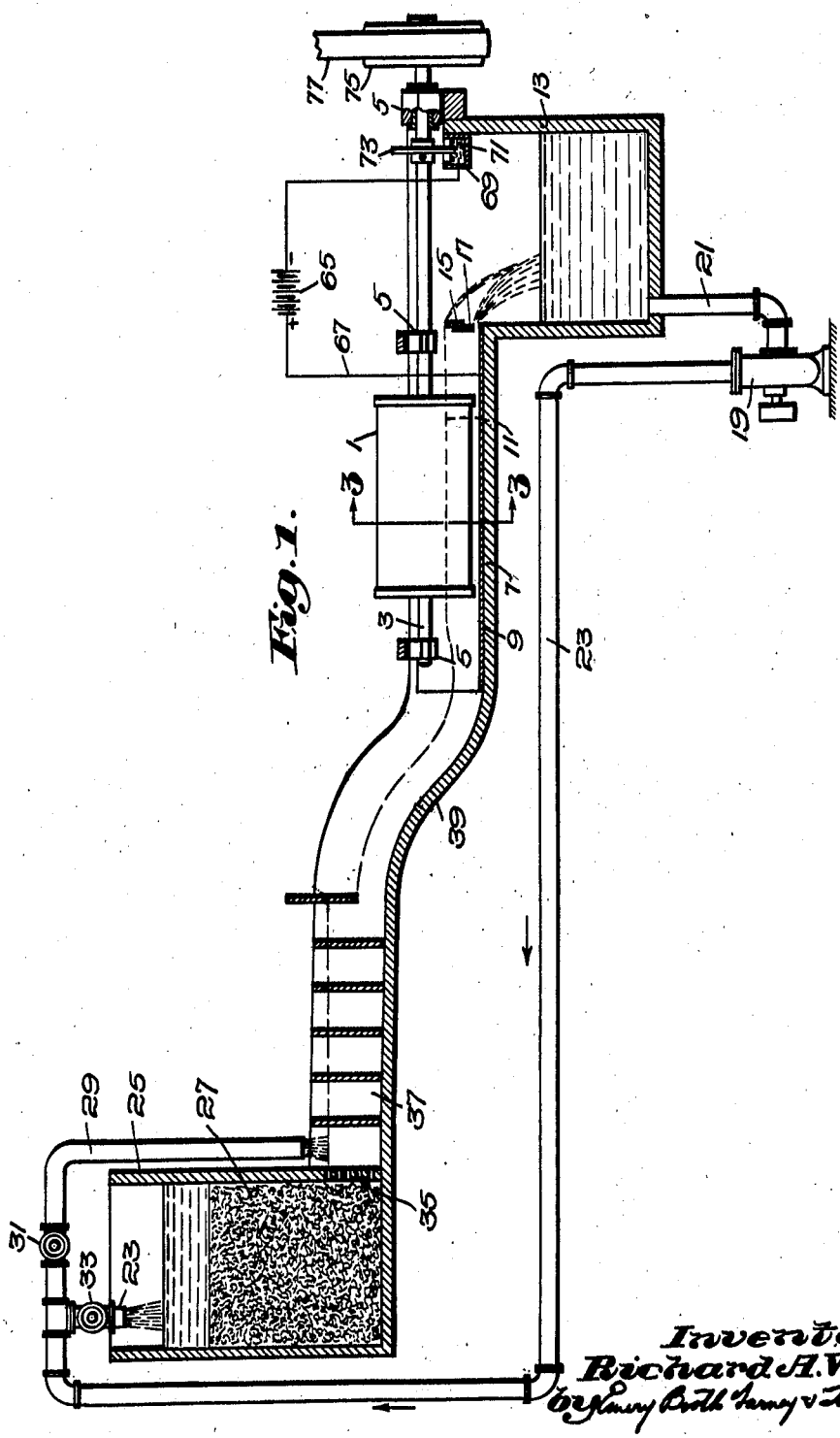

1,941,376

UNITED STATES PATENT OFFICE 1,941,376

ELECTROLYTIC APPARATUS

Richard A. Wilkins, Beverly, Mass., assignor to Industrial Development Corporation, Boston, Mass., a corporation of Maine Application November 8, 1929. Serial No. 405,669

8 Claims. (Cl. 204—6)

My invention relates to electrolytic apparatus, and particularly, but not exclusively, to apparatus for making sheet metal, such as sheet copper, by electro-deposition.

The invention will be best understood from the following description when read in the light of the accompanying drawings of several embodiments of the invention, while the scope of the invention will be more particularly pointed out in the appended claims.

In the drawings:—

Fig. 1 is a more or less schematic arrangement of one form of apparatus according to the invention;

Fig. 2 is an elevation of one form of cathode and associated parts, with parts in section, constructed according to the invention;

Fig. 3 is a section on the line 3—3 of Fig. 1; and

Fig. 4 is a detail showing a modified form of cathode.

Referring to the drawings, I have shown a drum 1, the surface of which, as hereinafter more fully explained, constitutes a cathode. Herein the drum is supported on a horizontal shaft 3, which preferably is of conductive material, and is mounted in bearings 5, the latter preferably supported in such manner as to insulate the shaft from the rest of the apparatus.

Herein the cathode drum extends into a horizontal trough 7 having a lining 9 of material, such as lead, insoluble in the electrolyte, which latter, as hereinafter explained, flows through the trough in contact with the cathode and lining, the lining thus constituting an insoluble anode in close proximity to the cathode surface.

As hereinafter more fully explained, the electrolyte, the level of which is indicated by the line 11 (Figs. 1 and 2) flows through the trough, in contact with the cathode and anode surfaces, in a swift-flowing stream, and falls from the end of the trough into a tank 13, the level of the electrolyte in the trough being maintained substantially horizontal by means of the overflow wier 15 and underflow wier 17.

As shown, a pump 19 draws the electrolyte through a pipe 21 from the tank 13, and forces it through a pipe 23 to a container 25, which latter contains a body 27 of metal-bearing electrolyte replenishing material. Herein, a pipe 29 and valves 31, 33 are provided for by-passing any desired portion of the electrolyte around the container 25.

As shown, the electrolyte discharges through the perforations 35 in the lower portion of one of the walls of the container 25, and enters a conduit 37, which conduit has a downwardly inclined portion 39 communicating with one end of the trough 7, the head between the conduit 37 and the trough being such as to cause the electrolyte to flow in a swift, continuous stream through the latter.

Referring more particularly to Figs. 2 and 3, the trough 7, which may be of wood or other suitable insulating material, has its lower portion, which contains the stream of electrolyte, coaxial with the shaft 3, the bearings 5 for said shaft being supported on beams 41 of wood or other suitable insulating material.

The cathode drum, as shown, comprises the end plates 43, of bronze or other suitable conductive material, said plates being carried by the shaft 3 and secured thereto by pins 45. Carried by the end plates 43 at the inner sides thereof are disks 47 of wood, or like material, secured to the end plates by means of screws 49, while extending from one disk 47 to the other are staves 51, of wood or like material, the ends of the staves being secured to the disks 47 by screws 53. Herein the outer sides of the end plates 43 are provided with coverings of non-conductive material inert with respect to the electrolyte, as for example, wooden disks 55 each coated with a layer 57 of rubber, the rubber coated disks being secured to the end plates 43 by stud bolts 59.

Sheathing the wooden barrel-like structure formed by the staves 51, and the peripheries of the disks 47, is a thin layer or sheet 61 of metal which constitutes the cathode proper. Preferably the coverings for the end plates 43 extend slightly beyond the outer surface of the sheet 61 for causing the sheet of electro-deposited metal, the latter stripped from the sheet 61 as hereinafter explained, to have a clean edge.

In the modification of the invention shown by Fig. 4 the construction is similar to that shown by Figs. 2 and 3, except that the outer conductive surface of the cathode consists of a tubular portion 63 of conductive material such as copper, on which is electro-plated the cathode sheet 61.

It will be noted from both constructions of cathode herein described that the cathode sheet 61 is in electrical communication with the shaft 3. In practice a suitable source of direct current electromotive force, herein indicated by the battery 65, is provided, the positive terminal of which may be connected as by a lead 67 to the insoluble anode 9, while the negative terminal thereof may be connected to a cup 69 containing a body of mercury 71, into the latter of which dips the periphery of a disk 73 secured to the shaft in electrical communication therewith.

The means for moving the cathode is herein schematically illustrated by the pulley 75 on the shaft 3, with which pulley cooperates a driving belt 77. It will be understood that the cathode drum may be slowly rotated, with or without oscillation about its axis of rotation, as desired, and depending upon other conditions, such as the swiftness of flow of the stream of electrolyte through the trough 7, diameter of the cathode drum, etc.

It will be understood that as the cathode drum is rotated a sheet of material is deposited thereon from the electrolyte, which sheet may be continuously stripped from the cathode and wound on a suitable reel. Herein the sheet of electro-deposited metal is indicated at 79 in Fig. 3, the stripping mechanism, the details of which do not form part of the present invention, being indicated schematically at 80. It will be understood that the stripping mechanism will be of such nature as effectively to coact with the particular kind of motion given the cathode, as for example, it may be that indicated in my co-pending application Serial No. 332,108, filed January 12, 1929, if the cathode has a combined oscillating and rotary motion, or that shown by Merrick Patent 1,601,690, issued September 28, 1926, if it has a simple rotary motion.

As one example of a manner of using the apparatus, but without limitation thereto, it has been found that satisfactory results may be obtained with the cathode surface 9 inches long and 12 inches in diameter spaced five-eighths of an inch from the adjacent surface of the insoluble anode, and immersed, through an angle of about 120 degrees, in the electrolyte, the latter flowing at the rate of about 300 gallons per minute, with the cathode given an oscillatory movement through 65 degrees in one direction and 60 degrees in the opposite direction, with twenty oscillations per minute, the latter resulting in one revolution of the cathode in 3.6 minutes. The electrolyte replenishing material employed in this example consists of about thirty pounds of #10 mesh jig concentrate Lake copper, placed in the tank for electrolyte replenishing material, the valves 31 and 33 for controlling the metal content of the electrolyte being regulated to maintain the copper sulphate ($CuSO_4.5H_2O$) concentration between 20 and 36 ounces per gallon of solution, and the corresponding sulphuric acid concentration between 16 and 8 ounces of commercial 66 degrees Baumé acid per gallon of solution. With an impressed voltage of about 2.5 volts, and a current density of about 200 amperes per square foot of immersed cathode surface, in this example of the use of the apparatus, copper foil of about 0.0003 inches in thickness is formed.

It will be understood that the apparatus is not limited to the deposition of any particular metal or metals, and that the electrolyte, the metal bearing material for replenishing the electrolyte, and the impressed voltage must be suited to the particular metal or metals to be deposited. When used for depositing sheet copper the electrolyte employed is preferably a copper sulphate solution containing a low percentage of free sulphuric acid, and the material for replenishing the metal content of the electrolyte is preferably metallic copper in such form as to provide a large surface area in contact with the electrolyte.

It will be understood that metallic copper is insoluble in dilute sulphuric acid at ordinary temperatures, although at higher temperatures it is soluble in concentrated acid with the formation of objectionable sulphur dioxide. By impressing a suitable voltage on the electrolyte replenishing material in contact with the electrolyte stream, the copper can be dissolved at ordinary temperatures without the formation of sulphur dioxide. In order to obtain best results with an insoluble anode it has been found that for copper the impressed voltage should not be less than about 1.5 volts.

The reason for the above phenomena is not exactly understood, but it is believed that the impressed voltage on the copper has an effect analogous to that of raising the chemical valence of the copper by oxidization from zero to plus one or plus two, at which value the copper will combine with the sulphate radical of the sulphuric acid of the electrolyte. For this explanation the chemical valence of a metal in contact with an acid solution may be considered as the force, measured by the electrical charge of the ions of the metal which tends to cause the metal to enter into solution. This force for convenience is herein called the "solution pressure" of the metal, which force, if the metal is to enter into solution when acted upon by an acid solution of the metal, must be sufficient to overcome the counter force of the metal already in solution tending to prevent additional metal entering the solution. This counter force for convenience is herein called the "osmotic pressure" of the metal in solution, and it has been found that by impressing on the metal in contact with the electrolyte a voltage sufficient to give the metal a "solution pressure" in excess of the "osmotic pressure" of the metal in solution, that the metal content of the electrolyte can be replenished to replace the metal deposited on the cathode, the rate of replenishment with the apparatus herein described being controlled by regulation of the valves 31 and 33, as hereinbefore explained, so as to prevent the metal content of the electrolyte exceeding a maximum limit and falling below a minimum limit, above and below which limits unsatisfactory results are obtained.

It has been found in operating the apparatus in the manner above described, that the resulting increased oxidizing effect of the electrolyte has a deleterious action upon the cathode surface when metals heretofore employed for the cathode are used. I have found that best results will be obtained by use of a metal for the cathode which is lower than hydrogen in the electromotive series of elements, so that the metal will not displace hydrogen from the free acid present, with resulting pitting or etching of the cathode surface. I have also found that best results will be obtained if the cathode surface is also of metal which in the electromotive series of elements is below the metal being electro-deposited from the electrolyte. For example, if copper is being electro-deposited, best results will be obtained if the metal of the cathode is not only below hydrogen to prevent it from being pitted and etched, but also below copper in the electromotive series of elements to prevent the cathode surface being plated with an adhering layer of copper by displacement from the electrolyte.

I have found that silver, gold, platinum, and iridium,—the so-called noble metals—, alloys of the same, and alloys rich in these metals, say those containing only small percentages of base metals such as copper, nickel, chromium, and zinc, will give satisfactory results, and further that with cathodes of such metals the adherence of the metal deposited is very slight, thus allowing the latter easily to be stripped from the cathode, which is of decided advantage when producing thin sheet material such as coper foil which, if it strongly adhered to the cathode, as with those heretofore employed, would be torn during the stripping operation.

When the exposed cathode surface is of silver, the cathode drum, when constructed according to Figs. 2 and 3, may be sheathed with a sleeve of pure silver, formed by bending over the drum a sheet of such metal from 0.001 to 0.003 inches in thickness, and soldering the overlapping scarfed edges with silver solder, as for example, a solder consisting of 145 parts silver, 73 parts brass, the latter consisting of 3 parts copper and 1 part zinc, and 4 parts zinc. Any exposed solder may be plated with silver by the so-called process of "sponge plating". The silver surface of the cathode may then be buffed and polished, and, if desired to facilitate the stripping operation, treated with a thin film of dilute potassium sulphide for forming thereon a film of silver sulphide. Wiping the surface with grease or animal fat dissolved in carbon tetrachloride or gasoline will further facilitate the stripping operation. When the cathode is constructed according to Fig. 4 the layer of silver may be electro-deposited on the copper sleeve 63, and the silver surface treated in a manner similar to that just explained.

It will be understood that wide deviations may be made from the embodiment of the invention herein described without departing from its spirit.

I claim:

1. A cathode drum having, in combination, a shaft, a cylindrical cathode shell comprising an inner layer and an outer silver layer, spaced drum-end-members of conductive material at opposite ends of said shell supported by said shaft in electrical communication therewith, said members having peripheral portions supporting said shell in electrical contact with at least said silver layer, and covers of insulating material inert with respect to the electrolyte for the opposite ends of said drum.

2. A cathode drum having, in combination, a shaft, a cylindrical cathode shell, members of conductive material at opposite ends of said shell supported by said shaft in electrical communication therewith, said members having peripheral portions supporting said shell in electrical contact therewith, cover members for the opposite ends of said drum, and sheet rubber covers for said cover members.

3. A cathode drum having, in combination, a shaft, a cylindrical cathode shell, members of conductive material at opposite ends of said shell supported by said shaft in electrical communication therewith, said members having peripheral portions supporting said shell in electrical contact therewith, and covers of insulating material inert with respect to the electrolyte for the opposite ends of said drum, said covers being carried by said drum and abutting the ends of said shell throughout the circumference of the latter and having slightly greater diameters than said shell.

4. A cathode drum having, in combination, a shaft, a cylindrical cathode shell, members of conductive material at opposite ends of said shell supported by said shaft in electrical communication therewith, said members having peripheral portions supporting said shell in electrical contact therewith, cover members of insulating material for the ends of said drum, and means held by said cover members against the ends of said shell constituting sheets of insulating material having cylindrical peripheral portions of slightly greater diameter than said shell.

5. A cathode drum having, in combination, a shaft, spaced drum-end-members of conductive material carried by said shaft, a cylindrical shell carried by said end members, a relatively thin outer layer of silver supported by said shell, said silver layer being in electrical communication with said end members, and covers of non-conductive material for said end members.

6. A cathode drum comprising, in combination, a shaft, spaced disk-like end members of conductive material carried by said shaft in electrical contact therewith, a rigid non-conductive barrel-like structure carried at opposite ends thereof by said end members, a sheath of conductive material carried by the barrel-like structure with its ends in electrical contact with said end members, and means forming covers of non-conductive material inert with respect to the electrolyte for the exterior surfaces of said end members.

7. A cathode drum comprising, in combination, a shaft, spaced disk-like end members of conductive material carried by said shaft in electrical contact therewith, a rigid non-conductive barrel-like structure carried at opposite ends thereof by said end members, a sheath of conductive material carried by the barrel-like structure with its ends in electrical contact with said end members, and means of non-conductive material inert with respect to the electrolyte contacting with the end portions of said sheath throughout its periphery and extending over the adjacent surfaces of said end members.

8. A cathode drum having, in combination, a shaft, a cylindrical cathode shell, members of conductive material at opposite ends of said shell supported by said shaft in electrical communication therewith, said members having peripheral portions supporting said shell in electrical contact therewith, cover members for the opposite ends of said drum, and means of non-conductive material contacting with the end portions of said shell throughout its periphery and extending over the adjacent surfaces of said end members.

RICHARD A. WILKINS.